(12) United States Patent
Geisselmann et al.

(10) Patent No.: US 12,710,627 B2
(45) Date of Patent: Aug. 18, 2026

(54) METHOD AND DEVICE FOR ALIGNING A LENS SYSTEM

(71) Applicant: Robert Bosch GmbH, Stuttgart (DE)

(72) Inventors: Benno Geisselmann, Sonthofen (DE); Tobias Windisch, Immenstadt (DE); Steffen Loewendorf, Kempten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 670 days.

(21) Appl. No.: 18/052,439

(22) Filed: Nov. 3, 2022

(65) Prior Publication Data

US 2023/0147112 A1 May 11, 2023

(30) Foreign Application Priority Data

Nov. 9, 2021 (DE) .................... 10 2021 212 601.4

(51) Int. Cl.

*G02B 27/00* (2006.01)
*G02B 7/00* (2021.01)
*G02B 7/02* (2021.01)
*G02B 15/15* (2006.01)

(52) U.S. Cl.

CPC ............ *G02B 15/15* (2013.01); *G02B 7/005* (2013.01); *G02B 7/023* (2013.01)

(58) Field of Classification Search

CPC ................................................. G02B 27/0012
See application file for complete search history.

(56) References Cited

U.S. PATENT DOCUMENTS

2018/0172983 A1* 6/2018 Maeda .................. G06N 3/084
2021/0232216 A1 7/2021 Hudman et al.

FOREIGN PATENT DOCUMENTS

DE 102017011463 A1 6/2018
JP 2021097989 A 7/2021

* cited by examiner

*Primary Examiner* — Joseph P Martinez
(74) *Attorney, Agent, or Firm* — NORTON ROSE FULBRIGHT US LLP

(57) ABSTRACT

A method for ascertaining an alignment of a lens system. The method include: aligning the lens system according to a provided first alignment; ascertaining a first refracted optical signal, the first refracted optical signal being ascertained by a refraction of a first emitted optical signal at the lens system (aligned according to the first alignment; ascertaining a first attribute value, the first attribute value characterizing an attribute of the first refracted optical signal; training a first machine learning system as a function of the first alignment and the ascertained first attribute value, the machine learning system being designed to ascertain an output for an alignment that characterizes the attribute of the alignment; ascertaining the alignment of the lens system based on an output of the first machine learning system.

10 Claims, 2 Drawing Sheets

METHOD AND DEVICE FOR ALIGNING A LENS SYSTEM

CROSS REFERENCE

The present application claims the benefit under 35 U.S.C. § 119 of German Patent Application No. DE 10 2021 212 601.4 filed on Nov. 9, 2021, which is expressly incorporated herein by reference in its entirety.

FIELD

The present invention relates to a method for ascertaining an alignment of a lens system, a device for aligning a lens system, a computer program, and a machine-readable memory medium.

BACKGROUND INFORMATION

In the production of an optical system such as an optical sensor, a telescope or a microscope, a recurrent problem is encountered around the suitable alignment of a lens system of the optical system, e.g., an individual lens or a multiplicity of lenses in an objective. For instance, it may be required to align a lens system in such a way that its focal point lies at a predefined point, and/or a focal length of the optical system reaches a predefinable value.

Because of manufacturing tolerances of both the lens system and other components of the optical system, finding a suitable alignment of the lens system poses a difficult challenge. Due to the corresponding tolerances, it may generally happen that what constitutes a suitable alignment of a first lens system does not constitute a suitable alignment of a second lens system. If a high number of units of the optical system is to be produced, it would therefore be desirable that a lens system be aligned so that it is coordinated with the optical system (in the sense of the varying attributes between products from the same production process).

In this context, it is desirable that an alignment process of the lens system can be carried out in the shortest time possible, in particular if lens systems of a multiplicity of optical systems are to be aligned. For example, for alignments of a predefinable multiplicity of alignments, it can be ascertained whether the individual alignment of the lens system is suitable for the optical system. To this end, possible alignments of the lens system may particularly be quantified in equidistant steps and the lens system be aligned according to the alignments quantified in this way. This procedure is also known as a grid search.

However, the disadvantage of this exhaustive approach is that the quantification must typically be very fine-grained in order to ensure the at least approximate mapping of a suitable alignment by the quantification without "skipping". For that reason, this way of finding an alignment of the lens system typically requires significant time because the lens system must be aligned and evaluated according to all alignments of the grid.

It is desirable to minimize the number of alignments to be checked. This poses a difficult challenge because an a priori limitation of the alignment suitable for a corresponding lens system is possible only to a limited degree on account of the afore-described tolerances.

SUMMARY

A method having the features of the of the present invention is able to ascertain a suitable alignment of a lens system based on a machine learning system. The inventors were able to determine that the appropriate use of the machine learning system makes it possible to evaluate a considerably smaller number of alignments than in the conventional methods.

According to a first aspect, the present invention relates to a method for ascertaining an alignment of a lens system. According to an example embodiment of the present invention, the method includes the following steps:

a. Aligning the lens system according to a provided first alignment;
b. Ascertaining a first refracted optical signal, the first refracted optical signal being ascertained by a refraction of a first emitted optical signal at the lens system aligned according to the first alignment;
c. Ascertaining a first attribute value, the first attribute value characterizing an attribute of the first refracted optical signal;
d. Training a first machine learning system as a function of the first alignment and the ascertained first attribute value, the machine learning system being developed to ascertain an output for an alignment that characterizes the attribute of the alignment;
e. Ascertaining the alignment of the lens system based on an output of the first machine learning system.

A lens system may be understood as a lens. Alternatively, a lens system may also be understood as a plurality of lenses. An objective, for example, may be considered a lens system. An alignment of a lens system may be understood as the relative positioning of the lens system with regard to a predefined point. For instance, the lens system is able to be aligned with regard to a desired focal point and/or with regard to a desired focal length. In other words, an alignment characterizes degrees of freedom based on which the lens system is able to be aligned in a three-dimensional space.

More specifically, an alignment may be understood as an orientation and positioning of a lens system in a three-dimensional space. An alignment can particularly be characterized by a six-dimensional vector, the vector characterizing a position along three axes of the three-dimensional space and characterizing a rotation about the axes in each case. As an alternative, it may also be possible that an alignment is characterized by a quaternion. Alternatively, an alignment may also be characterized by Euler angles.

According to an example embodiment of the present invention, the method for ascertaining the alignment may particularly be understood as a computer-implemented method, which means that the steps are executed by a computer. The step of aligning the lens system may denote that the computer ascertains actuation signals which suitably align the lens system.

The present method may be understood in such a way that the first attribute value is ascertained for the first alignment, and based on the first attribute value, it is ascertained whether the alignment is suitable with regard to the attribute. For this purpose, an optical signal is emitted through the lens system aligned according to the first alignment (the emitted optical signal). The emitted optical signal is refracted by the lens system. The optical signal refracted in this manner may then be received in a receiver unit, for example. Subsequently, the attribute value of the refracted signal is able to be ascertained.

The emitted optical signal is preferably emitted by an emitter unit. In addition, the emitter unit and the receiver unit are preferably fixed in terms of their position and orientation so that the first attribute value for the lens system is affected only by the first alignment.

The attribute, for instance, may characterize a focus, strength, or position of the refracted optical signal, which is measured by the receiver unit. Since the refracted optical signal is determined to a significant extent by the first alignment, the ascertained first attribute value may be understood as a measure of the first alignment. In the following text, it is generally understood that an attribute value with regard to an alignment constitutes the attribute value, which is determined when the lens system is aligned according to the alignment and the refracted optical signal is evaluated with regard to the attribute value. It is particularly also possible to ascertain multiple first attribute values with the aid of the first machine learning system, for instance when multiple attributes of the alignment are to be examined or are meant to become part of the optimization of the alignment of the lens system.

According to an example embodiment of the present invention, preferably, it may be the goal of the present method to align the lens system in such a way that the first attribute value lies within a predefinable value range and/or the first attribute values lie within a predefinable value range. In an advantageous manner, a suitable alignment of the lens system is estimated for this purpose based on the output of the first machine learning system. To this end, the lens system is initially aligned according to the first alignment and the first attribute value or first attribute values is/are ascertained. Next, the first machine learning system can be trained so that it predicts the first attribute value or first attribute values with regard to the first alignment. In other words, the first machine learning system can be trained in such a way that it learns, specifically for the lens system, which alignment leads to which particular attribute value. If the method is used to align a multiplicity of lenses, then a first machine learning system specific for a lens system is able to be trained in each case.

According to an example embodiment of the present invention, in the method, it is preferably also possible to provide multiple first alignments and to ascertain the individual first attribute value or first attribute values for the first alignments. An output of the first machine learning system may be understood as an estimate of an attribute value or a multiplicity of attribute values of an alignment supplied to the first machine learning system.

While the lens system is aligned according to the alignment in order to ascertain an attribute value or a multiplicity of attribute values with regard to an alignment, only the first machine learning system may be evaluated to estimate the attribute value or the multiplicity of attribute values. The inventors were able to determine that considerably fewer second alignments must be ascertained by the method until an alignment of the lens system is suitable, with the result that the process of aligning the lens system is accelerated considerably.

For the remaining part of the description, in particular embodiments that relate to the ascertainment and output of an attribute value are described. It is of course understood in this context that it will be obvious to one skilled in the art that it is also possible to ascertain or output multiple attribute values.

In an advantageous manner, only a relatively small number of first alignments must be adjusted and evaluated for the lens system by the present method. The process of estimating may be understood as a virtual alignment and evaluation of an alignment of the lens system. This allows for a much faster evaluation of a multitude of alignments than in a real alignment and evaluation of the lens system.

An alignment of the lens system according to an alignment may particularly be understood to indicate that the lens system is aligned on a test bench. An evaluation of the attribute of the alignment may then be understood to describe that an optical signal is transmitted through the lens system on the test bench, the optical signal is refracted at the lens system, and the refracted optical signal is subsequently processed by a receiver unit to ascertain an attribute value that characterizes the attribute.

In different preferred embodiments of the present method, it is possible that the ascertaining of the alignment of the lens system based on the output of the first machine learning system encompasses the following steps:

f. Ascertaining a second alignment such that an output of the first machine learning system ascertained for the second alignment lies within a predefined value range;
g. Ascertaining a second refracted optical signal, the second refracted optical signal being ascertained by a refraction of a second emitted optical signal at the lens aligned according to the second alignment;
h. Ascertaining a second attribute value, the second attribute value characterizing the attribute of the second refracted optical signal;
i. If the second attribute value for the second alignment does not lie within a value range predefinable for the second attribute value, repeating steps d., f., g. and h., the second alignment being used as an additional first alignment for training the first machine learning system; Otherwise, providing the second alignment as an alignment of the lens system.

The described embodiments according to an example embodiment of the present invention may be understood as an iterative method. In the respective iterations, an individual alignment is ascertained, the machine learning system is trained using the alignment, and a better alignment of the lens system is then ascertained based on the output of the machine learning system. This may be understood in such a way that the estimation of the machine learning system with regard to a suitable alignment of the lens system is checked in reality via an alignment of the lens system and an ascertainment of the attribute value with regard to the alignment. As a result, the machine learning system converges more and more towards an ever more precise estimation of the actual attribute value with regard to the alignment. The inventors were able to determine that the convergence advantageously sets in very rapidly so that a suitable alignment of the lens system is already ascertained after a few iterations.

In an advantageous manner, the pair of second alignment and second attribute value ascertained in an iteration may be added to the training data of the first machine learning system in a subsequent iteration. This transmits more knowledge to the first machine learning system about the relationship between an alignment and the attribute value with regard to the alignment in every iteration. The method converges even faster as a consequence.

This procedure may also be understood as a form of active learning. With the aid of the first machine learning system, points (the second alignments) are iteratively ascertained for which a value (the second attribute value) to be determined by the first machine learning system is ascertained in reality. The pairs ascertained in this manner may then be used for the further training of the first machine learning system.

In an advantageous manner, the laborious calculation of a suitable alignment may therefore be ascertained by optimizing an approximation, the approximation being ascertained by the machine learning system. The alignment obtained by the optimization of the approximation may subsequently be tested by aligning the lens system according to the obtained alignment. The iterative method makes it possible for the approximation to become ever more precise so that a suitable alignment is advantageously already found after just a few iteration steps.

According to an example embodiment of the present invention, a second alignment may be considered suitable if the second attribute value lies within the predefinable value range. The predefinable value range of the second attribute value may particularly be the same as the predefinable value range for the first attribute value.

To determine the second alignment, it is particularly possible to solve an optimization problem, and an alignment for which a corresponding second attribute value is maximized or minimized is provided as the second alignment.

In the method, it is preferably also possible to ascertain the second alignment based on an optimization, in which a restraint characterizes a compliance with at least one limit of the predefinable value range of the second attribute value.

The optimization may preferably be characterized by the formula $$\underset{x}{\operatorname{argmax}} s \text{ where}$$

$$p(x) - s \geq l,$$

$$p(x) + s \leq u,$$

$$s \geq 0,$$

where x is an alignment, p(x) is the second attribute value ascertained by the first machine learning system for the alignment, l is a lower limit of the predefinable value range, and u is an upper limit of the predefinable value range.

In all embodiments of the present method, it is basically also possible to examine more than one attribute for an alignment. In the event that the second attribute value is optimized directly, a Pareto optimization may be performed if multiple attributes to be examined are involved (that is to say, when a multiplicity of first attribute values is present and a plurality of second attribute values). In the case of an optimization under constraints, constraints with regard to predefinable value ranges for the respective attributes may be added.

Preferably, it is also possible to pretrain the first machine learning system to begin with. The subsequent training of the first machine learning system may be understood as a fine-tuning of the first machine learning system. Because of the pretraining, the first machine learning system is already able to ascertain sufficiently precise estimates after just a few iteration steps. For example, the pretraining may be carried out in such a way that different first alignments are initially used on a test bench for a lens system or a multiplicity of lens systems and the corresponding first attribute values are ascertained. The pairs of first alignment and first attribute value ascertained in this way may then be used for pretraining purposes as a training dataset of the first machine learning system.

A pretraining of the first machine learning system may also include pruning the first machine learning system, e.g., removing trainable parameters of the first machine learning system. The parameters to be reduced may particularly be ascertained based on a validation dataset.

According to an example embodiment of the present invention, it is preferably possible that the first machine learning system includes a polynomial model, which is designed to ascertain an output that characterizes the attribute for an alignment.

The polynomial model may particularly be designed to estimate a first attribute value or a multiplicity of first attribute values with regard to a first alignment. The machine learning system may also encompass multiple polynomial models, especially one polynomial model for each first attribute value to be predicted. The advantage of the use of the polynomial model is that the polynomial model can be trained very rapidly. This further reduces the time required to ascertain the alignment of the lens system.

In one preferred example embodiment of the method of the present invention, it is furthermore possible to provide a multiplicity of first alignments based on a Bayesian optimization method in a step a.

In an advantageous manner, a multiplicity of first alignments that characterize at least one initial restriction of suitable alignments is able to be ascertained in this way. As a result, the approximation of the first machine learning system converges even faster, and the method is further accelerated.

As an alternative, it is also possible to ascertain the first alignment based on a second machine learning system, the second machine learning system being designed to determine a change in the alignment that leads to a more suitable alignment based on an alignment.

For example, it is possible that a preliminary alignment is determined at random, which is then improved iteratively, preferably using a multiplicity of iteration steps, based on the second machine learning system. In each iteration, for example, the second machine learning system may be used to ascertain a change for the preliminary alignment, the preliminary alignment be adapted according to the ascertained change, and the adapted alignment then be supplied to the next iteration as a preliminary alignment. In the method, a preliminary alignment or a multiplicity of the preliminary alignments may subsequently be used as the first alignment or as the multiplicity of first alignments. In an advantageous manner, the first alignment or first alignments is/are suitably restricted even before the method is carried out, which means that the method converges even more rapidly, and the alignment of the lens system may thus be ascertained even faster.

The second machine learning system may especially include a neural network which is designed to predict a suitable change for an alignment.

The second machine learning system is preferably able to be trained with the aid of a reinforcement learning method.

The use of a reinforcement learning method requires the definition of states and actions for the second machine learning system. In particular an alignment may be used as a state. The second machine learning system may therefore be designed to process an alignment. As an alternative or in addition, it is also possible to use as a state the attribute value or attribute values ascertained for an alignment. The action ascertained by the second machine learning system may particularly be a change which indicates the way in which an alignment provided to the machine learning system is to be modified.

The training with the aid of a reinforcement learning method uses a reward function. In the present method, the reward function may be a cumulative quality with regard to ascertained preliminary alignments, in particular across multiple actions of the second machine learning system. For instance, to ascertain training data of the second machine learning system starting with a randomly selected preliminary alignment, a multiplicity of further preliminary alignments may be ascertained in that a preliminary alignment based on a previous preliminary alignment is ascertained in an iteration step in each case. As an alternative or in addition, it is also possible to use a multiplicity of preliminary alignments as training data of the second machine learning system, e.g., a predefinable number of alignments along a grid in the space of the alignments. A corresponding attribute value for the alignments of the multiplicity of preliminary alignments may then be ascertained on a test bench. For the attribute values ascertained in this way, it can additionally be ascertained how far they are from corresponding limits of a predefinable value range of the attribute value and simultaneously lie within the value range, and a distance from the limits may be understood as a quality measure of the individual preliminary alignment. The reward for the thereby ascertained multiplicity of preliminary alignments may be a sum of the quality measures. The second machine learning system can then be trained, preferably with the aid of a policy gradient method.

An advantage of training the second machine learning system is that the second machine learning system is trained in such a way that every change ascertained by the second machine learning system is accompanied by the best possible improvement in a corresponding preliminary alignment. In this way, the first alignment or first alignments is/are effectively restricted to suitable values, which means that a subsequent ascertainment of the alignment of the lens system can be obtained in an even shorter time.

In the following text, embodiments of the present invention will be described in greater detail with reference to the figures.

DETAILED DESCRIPTION OF EXAMPLE EMBODIMENTS

Figure 1:
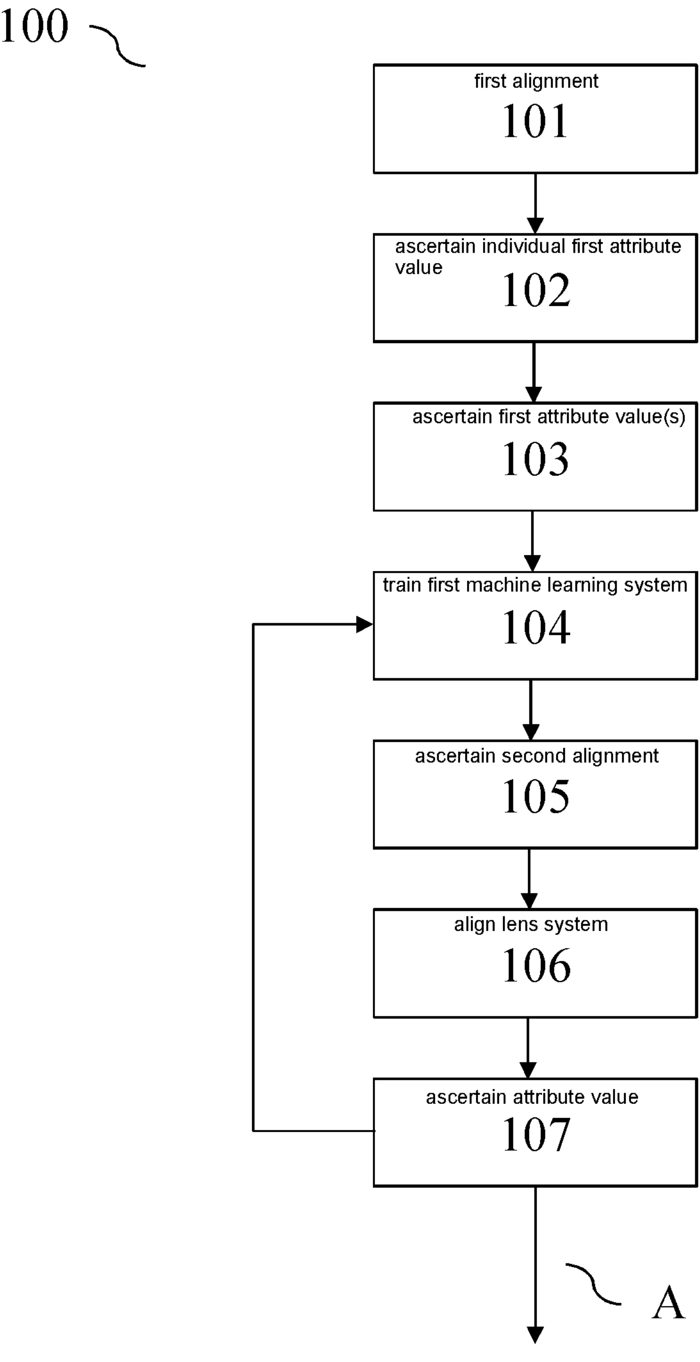
FIG. 1 shows schematically, a sequence of a method for ascertaining an alignment of a lens, according to an example embodiment of the present invention.

FIG. 1 shows a flow diagram which characterizes the sequence of a method for ascertaining an alignment (A) of a lens. In a first step (101) of the method, a first alignment is provided to begin with. For example, the alignment may be provided based on a second machine learning system. As an alternative, it is also possible to randomly ascertain the first alignment based on possible numerical values of the alignment. For instance, the alignment may be characterized by a six-dimensional vector, a six-dimensional random vector being able to be utilized to provide the first alignment. Preferably, multiple first alignments can also be provided in the first step (101).

For the first alignment or first alignments, an individual first attribute value is ascertained in a second step (102). As an alternative, it is also possible to ascertain multiple first attribute values for the first alignment or first alignments. The first attribute value or first attribute values for a first alignment can be ascertained in the following manner. First, the lens system is aligned according to the first alignment. Next, an optical signal such as a light signal from the visible light range is emitted by the lens system. The optical signal is refracted by the lens system. The optical signal refracted in this way can then be received in a receiver unit. The receiver unit may include an image sensor, for instance, with whose aid the refracted optical signal is able to be detected.

Based on the detected signal, the first attribute value or first attribute values is/are then ascertained in a third step (103) of the method. For instance, a first attribute value may characterize a focusing measure, a strength of the refracted signal, or a position of the refracted signal with regard to the image sensor.

If multiple first alignments are provided in the first step (101), then a first attribute value or a multiplicity of first attribute values can preferably be ascertained for a first alignment.

All ascertained pairs of first alignment and first attribute value or first attribute values are then used in a fourth step (104) for training a first machine learning system. The first machine learning system preferably includes a polynomial model, which is designed to predict the corresponding first attribute value based on a first alignment. The polynomial model can be pretrained, preferably by a pretraining which takes place prior to the present method (100). The pretraining may particularly include an adaptation of the coefficients of the polynomial model so that a suitable degree of the polynomial model is selected. This is able to be accomplished especially with the aid of a cross validation. The preferably pretrained polynomial model can then be refined based on the pairs.

If the machine learning system is to predict multiple attribute values for an alignment, then the polynomial model may also be designed to predict all first attribute values. Alternatively, it is also possible that the first machine learning system has its own polynomial model for predicting a first attribute value in each case.

In a fifth step (105), a second alignment is then ascertained based on the first machine learning system trained in the fourth step (104). To this end, an optimization problem may preferably be solved such that the attribute value estimated by the first machine learning system for the second alignment lies within a predefinable value range. The predefinable value may particularly be characterized by a lower and/or an upper limit, and a target function of the optimization preferably characterizes a distance of the estimated attribute value from the upper and/or from the lower limit. The goal of the optimization may especially be understood to denote that the second alignment is ascertained in such a way that the attribute value estimated for the second alignment has the maximally possible distance from the lower and/or from the upper limit. To solve the optimization problem, it is possible to use known methods especially from the field of non-linear optimizations such as non-linear programming methods.

In a sixth step (106), the lens system is then aligned according to the second alignment. Next, an optical signal is transmitted by the lens system, and a refracted optical signal is ascertained.

In a seventh step (107) of the present method (100), an attribute value is able to be ascertained for the refracted optical signal ascertained in this manner, similar to the first alignments. This attribute value can then be provided as a second attribute value. It may subsequently be checked whether the second attribute value lies within the predefinable value range. If this is the case, then the second alignment is able to be provided as an alignment (A) of the lens system, and the method can be terminated.

If the second attribute value does not lie within the predefinable value range, especially steps four (104) through seven (107) of the method (100) can be repeated. Preferably, the pair made up of the second alignment and second attribute value is able to be provided in the training set as a further first alignment and further first attribute value. The steps four (104) through seven (107) of the method (100) may particularly be iteratively repeated until the second attribute value lies within the predefinable value range.

It may also happen that the present method is unable to ascertain an alignment because of physical conditions or an unsuitable first alignment, so that the first attribute value or first attribute values lie(s) within its/their individually predefinable value range. In such a case, the present method can be aborted after a predefinable number of iteration steps. The predefinable number of iteration steps may particularly be defined on the basis of an expected number of iteration steps, the expected number characterizing a number of steps after which the method typically has determined an alignment so that the first attribute value or first attribute values lie(s) within the individually predefinable value range. The predefinable number of iteration steps, for example, may be twice the number of the expected iteration steps. Optionally, the present method may also be newly started for a lens system having a new first alignment if the predefinable number of iteration steps was attained or exceeded.

Figure 2:
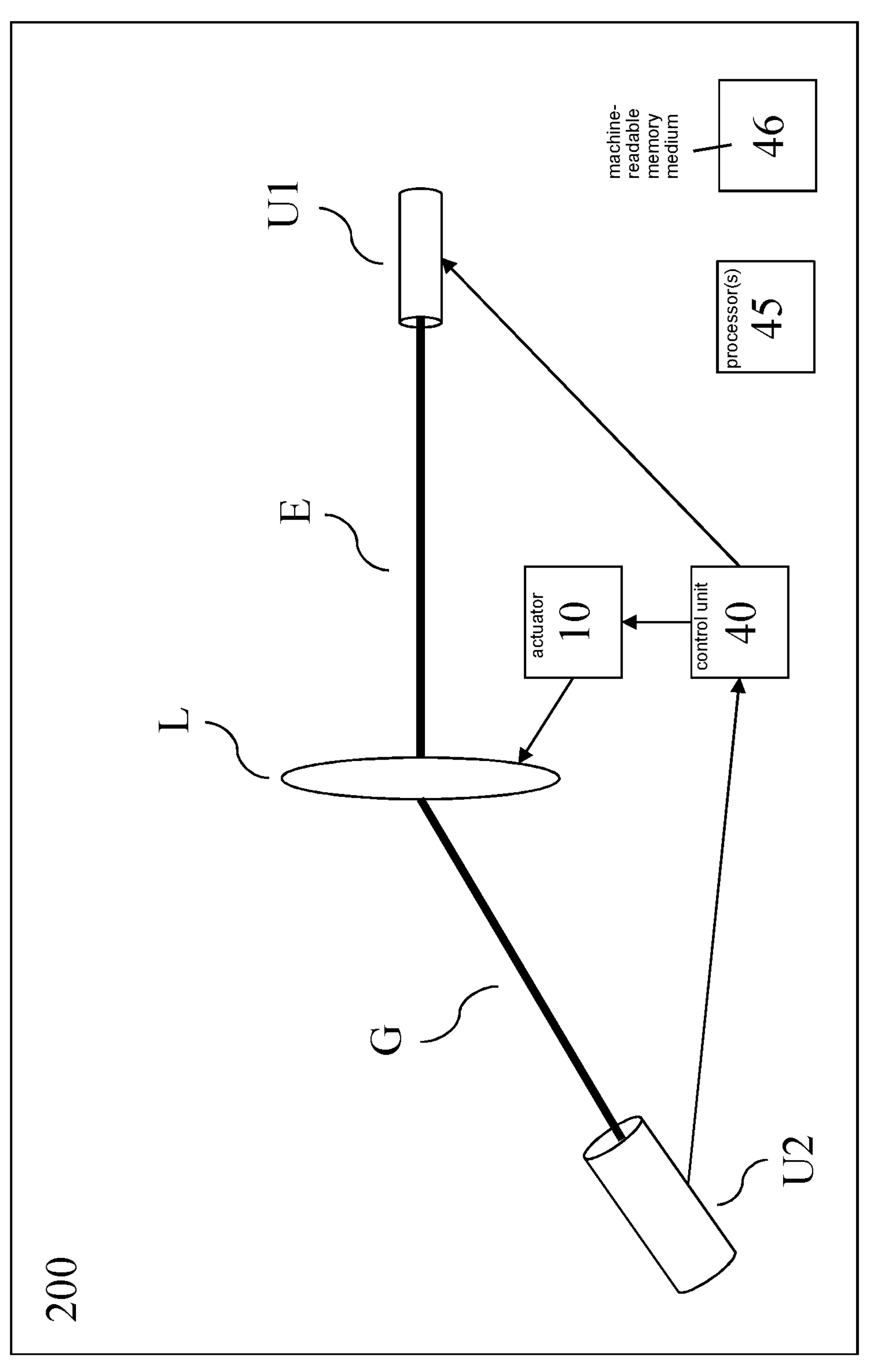
FIG. 2 shows schematically, a device for executing the method, according to an example embodiment of the present invention.

FIG. 2 shows a device (200), which is designed to carry out the present method (100). Device (200) includes a control unit (40) designed to carry out the steps of the method (100). Control unit 40 controls an actuator (10), which is able to align the lens system (L) according to a predefinable alignment. More specifically, the actuator (10) may be a motor capable of mechanically aligning the lens system (L).

To ascertain an attribute value with regard to an alignment, the control unit (40) is able to actuate the actuator (10) in such a way that the lens system (L) is aligned according to the alignment. Next, the control unit (40) can actuate an emitter unit (U1) such that the emitter unit emits an optical signal (E). Optical signal (E) is refracted at the lens system (L) and a refracted optical signal (G) ascertained in this way is received in a receiver unit (U2). The receiver unit (U2) may preferably include an image sensor which is able to measure the refracted optical signal (G).

The signal (G) received in receiver unit (U2) can then be evaluated to ascertain the attribute value. The attribute value determined in this way may then be transmitted back to the control unit (40). As an alternative, it is also possible to transmit a measurement of the image sensor itself to the control unit (40), and the control unit (40) subsequently ascertains the attribute value.

In further preferred embodiments, the control unit (40) includes at least one processor (45) and at least one machine-readable memory medium (46) on which instructions are stored that when executed on the at least one processor (45), induce the control unit (40) to carry out the method (100).

The term 'computer' encompasses all kinds of devices for processing predefinable arithmetic rules. These arithmetic rules may be present in the form of software or in the form of hardware or also in a mixed form of software and hardware.

In general, a multiplicity may be understood as indexed, that is to say, every element of the multiplicity is assigned a unique index, preferably by assigning consecutive whole numbers to the elements included in a multiplicity. Preferably, if a multiplicity includes N elements, N being the number of elements in the multiplicity, the elements are assigned the whole numbers from 1 to N.

What is claimed is:

1. A method for ascertaining an alignment of a lens system, comprising the following steps:

a. aligning the lens system according to a provided first alignment;

b. ascertaining a first refracted optical signal, the first refracted optical signal being ascertained by a refraction of a first emitted optical signal at the lens system aligned according to the first alignment;

c. ascertaining a first attribute value, the first attribute value characterizing an attribute of the first refracted optical signal;

d. training a first machine learning system as a function of the first alignment and the ascertained first attribute value, the machine learning system being configured to ascertain an output for an alignment that characterizes the attribute of the alignment; and e. ascertaining the alignment of the lens system based on the output of the first machine learning system, wherein the first machine learning system includes a polynomial model, which is configured to ascertain the output that characterizes the attribute for an alignment.

2. The method as recited in claim 1, wherein the first machine learning system is pretrained in a step in advance of the method.

3. The method as recited in claim 1, wherein the ascertaining of the alignment of the lens system based on the output of the first machine learning system includes the following steps:

f. ascertaining a second alignment in such a way that an output of the first machine learning system ascertained for the second alignment lies within a predefinable value range;

g. ascertaining a second refracted optical signal, wherein the second refracted optical signal is ascertained by a refraction of a second emitted optical signal at the lens system aligned according to the second alignment;

h. ascertaining a second attribute value, the second attribute value characterizing the attribute of the second refracted optical signal;

i. when the second attribute value for the second alignment does not lie within a value range predefinable for the second attribute value, repeating steps d, f, g and h, the second alignment being used as an additional first alignment for training the first machine learning system; otherwise, when the second value for the second alignment lies within the value range predefinable for the second attribute value, providing the second alignment as the alignment of the lens system.

4. The method as recited in claim 3, wherein the second alignment is ascertained based on an optimization, a constraint of the optimization characterizing at least one limit of the predefinable value range.

5. The method as recited in claim 1, wherein the first alignment is provided based on a Bayesian optimization method.

6. The method as recited in claim 1, wherein the first alignment is ascertained based on a second machine learning system, the second machine learning system being designed to determine a change in the alignment based on an alignment.

7. The method as recited in claim 6, wherein the second machine learning system is trained using a reinforcement learning method.

8. The method as recited in claim 1, wherein the lens system is part of an optical sensor.

9. A device for aligning a lens system, the device being configured to:

a. align the lens system according to a provided first alignment;

b. ascertain a first refracted optical signal, the first refracted optical signal being ascertained by a refraction of a first emitted optical signal at the lens system aligned according to the first alignment;

c. ascertain a first attribute value, the first attribute value characterizing an attribute of the first refracted optical signal;

d. train a first machine learning system as a function of the first alignment and the ascertained first attribute value, the machine learning system being configured to ascertain an output for an alignment that characterizes the attribute of the alignment; and e. ascertain the alignment of the lens system based on the output of the first machine learning system, wherein the first machine learning system includes a polynomial model, which is configured to ascertain the output that characterizes the attribute for an alignment.

10. A non-transitory machine-readable memory medium on which is stored a computer program for ascertaining an alignment of a lens system, the computer program, when executed by a processor, causing the processor to perform the following steps:

a. aligning the lens system according to a provided first alignment;

b. ascertaining a first refracted optical signal, the first refracted optical signal being ascertained by a refraction of a first emitted optical signal at the lens system aligned according to the first alignment;

c. ascertaining a first attribute value, the first attribute value characterizing an attribute of the first refracted optical signal;

d. training a first machine learning system as a function of the first alignment and the ascertained first attribute value, the machine learning system being configured to ascertain an output for an alignment that characterizes the attribute of the alignment; and e. ascertaining the alignment of the lens system based on the output of the first machine learning system, wherein the first machine learning system includes a polynomial model, which is configured to ascertain the output that characterizes the attribute for an alignment.

* * * * *